June 14, 1938. W. W. CRILEY 2,120,798
HYDRAULIC CLUTCH
Filed March 9, 1936
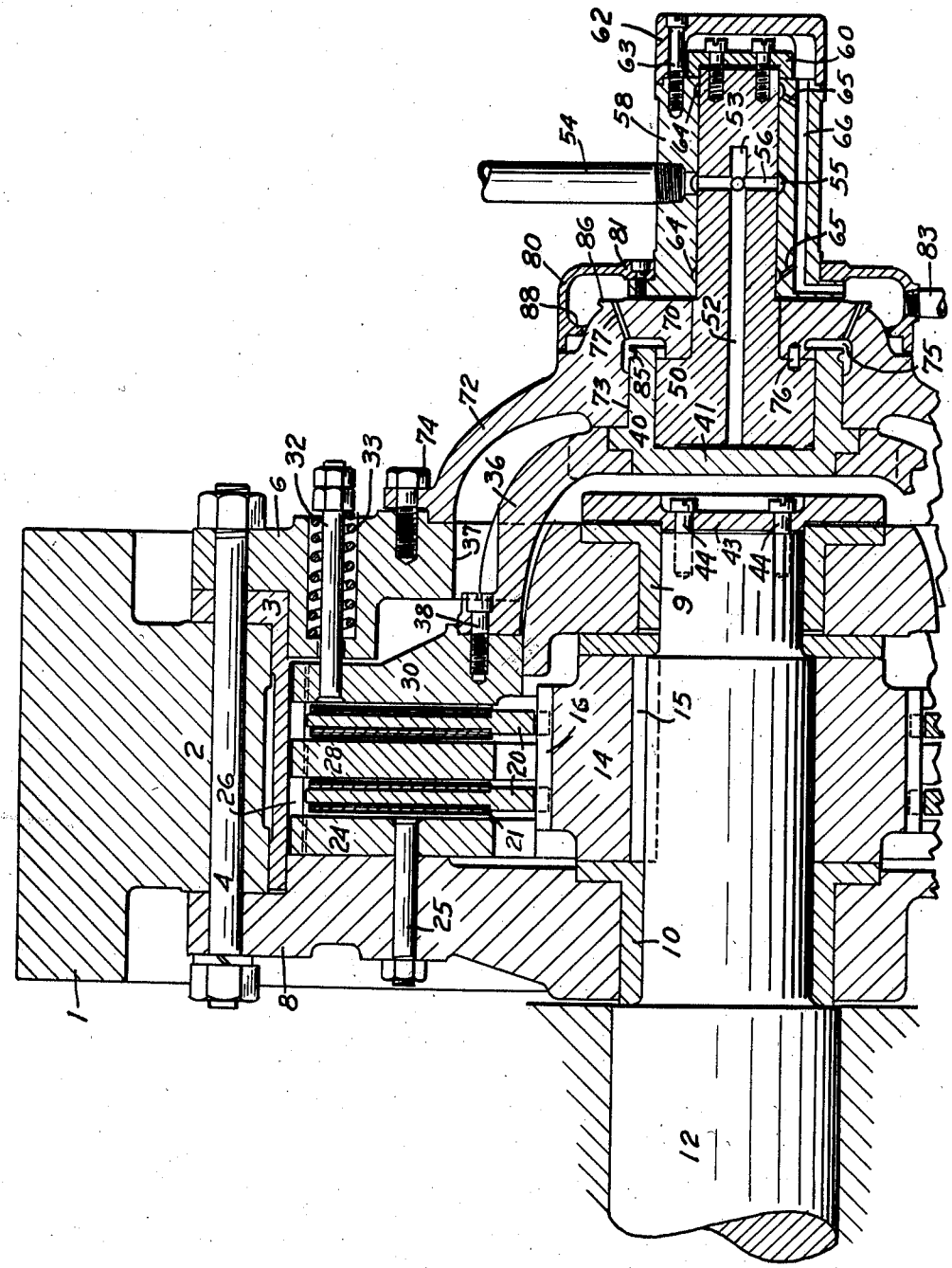
INVENTOR.
WILLIAM W. CRILEY
BY Justin D Macklin
ATTORNEY.

Patented June 14, 1938

2,120,798

UNITED STATES PATENT OFFICE 2,120,798

HYDRAULIC CLUTCH

William W. Criley, Cleveland, Ohio

Application March 9, 1936, Serial No. 67,856

11 Claims. (Cl. 192—85)

This invention relates to fluid operated clutches, particularly of the type known as quick acting, heavy duty clutches designed for use in operating forging machines, presses and like machinery. The clutch of the present invention is particularly designed for operation by liquid under high pressure. It may be used in environments and for the purposes such as that of my prior Patent No. 1,968,130, granted July 31, 1934, and also that of my prior application filed August 15, 1935, Serial No. 36,317, on Combined safety friction slip and air operated clutch. It is of the dry disk type and has some of the features of combined fly wheel and disk arrangement of the clutches shown and described in that patent and said application.

There are some installations where the use of air pressure or gaseous fluid is not satisfactory; in fact, some large shops have no supply of pressure air or may have an inadequate supply. Therefore, one of the objects of the present invention is to utilize liquid, such as oil, in association with a forging machine or the like, and under such high pressure as to effectively operate such a friction clutch.

In the use of such liquids, it is essential that none of it be allowed to reach the dry friction disks of such a clutch for obvious reasons. For example, if oil is used, even a small amount on the friction disks may render the clutch quite ineffective. At least, it greatly impairs its efficiency.

In the design of such a clutch, it is desirable to have the parts of the clutch closely associated and compact in their assembly, and it is further desirable to arrange them within a heavy fly wheel part.

The construction of the patent and application above referred to not only illustrates in general such an arrangement but sets forth the objects and advantages, which include desirability of quick action, the application of the desired amount of power for ordinary service operation, while being capable of application of greater gripping power to move the machine out of a stalled or locked condition. Further, the control of the torque capacity for normal operation, the effect of a safety friction slip in connection with the composite assembly, and the whole being characterized by convenience, cheapness of manufacture, and effectiveness of operation.

If in such an assembly, liquid is used for operating a piston in the nature of a ring-like disk, the area of such an operating member is so large that an objectionably large amount of liquid is required for the operation of the clutch. Furthermore, if the liquid is applied in such a direction as to move the piston toward the disks, leakage may result which tends to pass the piston in a direction toward the disks.

Difficulty is encountered in preventing this leakage toward the clutch plates because there is no opportunity for providing permanently stationary collar oil collecting rings within the clutch assembly, part of which is continuously rotating, and the other part alternately rotating therewith and relatively stationary during normal operation. The relatively large circumference of a ring-like piston affords greater difficulty in preventing this leakage.

A further important object of the present invention therefore is to so arrange the clutch parts that the liquid may be applied to an operating surface on a rotating but relatively axially stationary piston embraced by a rotatable and axially movable cylinder, the inner end of which is closed and which moves toward the friction disks when liquid pressure is applied. This arrangement provides for a novel feature of arresting and collecting any overflow of oil which flows in a direction outwardly and away from the operating parts and from the dry friction disks of the clutch.

Another object is to provide a fluid operated clutch having the clutch operating parts mounted between the inclosing rigid parts of the inertia member, thus avoiding placing the clutch plate engaging force on any bearings.

A further specific object is the provision of a construction in connection with such an operating piston and movable cylinder which, by reason of the axially stationary character of the piston, permits the use of a very efficient construction of great accuracy and strength of the means for bringing the oil to the operating surfaces of the piston and cylinder through the least number of oil conduit joints.

The arrangement whereby the above and other objects are accomplished will become apparent from the following description, which relates to the accompanying drawing which illustrates a preferred embodiment of the present combined clutch and friction drive liquid operated mechanism.

The drawing is in the nature of a central longitudinal radial section through the upper half of a clutch fly wheel and liquid operating mechanism assembly. It is understood that the lower half of the view is partially omitted, but that the parts are symmetrical with those shown.

In the drawing, a fly wheel or inertia member is shown as carried on side disk-like members 6 and 8, shown as fitted on suitable bearings 9 and 10 on the shaft 12. This shaft may represent any suitable driven member, such, for example, as the countershaft of a forging machine which may in turn be suitably geared to the main shaft of such machine. The fly wheel 1 is usually driven by a suitable belt. In the arrangement shown, the fly wheel 1 has a wide inwardly projecting flange 2 in which is fitted a flanged ring member 3, seated in cylindrical and radial surfaces of the members 6 and 8 and secured by bolt members 4 passing through suitable openings in the wheel disk members. This composite structure, namely, the fly wheel, member 3, and side members 6 and 8, are free to rotate on the bearings 9 and 10 on the shaft 12.

Between the members 6 and 8, I provide a collar 14 keyed as at 15 to the shaft 12 and having teeth 16 which are slidably engaged by notches on the inner periphery of the friction disk members 20. On these disks are carried the usual friction disk rings 21, one of which is engaged for clutching action by a ring-like disk 24, shown as rigidly secured to the side disk member 8 as by a bolt 25, while at its periphery it is provided with spline-like notches to engage teeth 26 rigidly formed on and projecting inwardly from the member 3.

A disk member 28 is shown between the two friction members 20 and similarly is engaged and supported by the teeth 26, for movement axially. A movable operating disk member 30 is fitted to slide axially on the teeth 26 at the periphery. In the drawing the member 30 is shown as normally retracted to non-engaging position as by bolts 32, secured thereto and having nuts at the outer ends between which nuts and the disk member 6 a compression spring 33 may act to yieldably hold the member 30 in retracted condition.

The means for applying pressure to move the disk inwardly preferably comprises a spider-like member having legs 36 extending through openings as at 37 in the disk member 6 and each leg 36 being suitably secured as by bolts 38 to the member 30. The central portion of the spider member is engaged by a pressure operating cylinder 40, closed as at 41 on the side toward the clutch, and opening outwardly as shown.

The cylinder 40 and the spider member are preferably separate parts and are engageable through a flanged thrust joint which permits limited relative movement therebetween, prevents cocking and binding of the cylinder, and also insures symmetrical distribution of pressure on the friction disks.

Obviously, as this cylinder is moved inwardly, it will carry with it the spider 36 and the disk 30 and bring the disk members 20 and the disk members 24, 28 and 30 into frictional driving engagement, thus drivingly connecting the fly wheel 1 through the collar 14 with the shaft 12.

It will be noted that the wheel and hub assembly are shown as retained on the end of the shaft 12 as by a disk-like cap 43, which may be secured as by screws 44.

Within the cylinder 40, which it will be seen rotates with the fly wheel, is a rotatable and relatively axially stationary piston 50, preferably closely fitted to the inner wall of the cylinder member 40 and which is shown as having a central passage 52 opening at the inner end of the piston, and to which liquid under pressure may be brought through a suitable supply line 54 connected through a channel 55 and radial passages 56.

As shown, the piston has in effect an elongated outwardly extending shaft in which the passages just mentioned are carried, and which is surrounded by a carrying sleeve 58 to which the line 54 is threaded.

Bridging the outer end of the extension 53 of the piston is a cap 60, tightly fitted over the end and suitably secured as by the screws shown, while outside of this cap is also tightly fitted to the sleeve 58 still another cap 62, also secured as by screws 63.

Near the ends of the sleeve 58 are shown oil channels 64 with which are connected drain passages 65 leading to a common passage 66 extending inwardly from the end of the sleeve. The cap 62 is also arranged to communicate with the drain passage 66. Thus, any oil escaping from the channel 55 is trapped at either end of the sleeve. Even if it reaches the end of the shank 53, it is caught within the oil-tight cap 62 at one end, and even if it passes the inner channel 64, provision is made for catching it there along with any leakage from the cylinder piston, as will now be described.

Surrounding the shank of the piston member is the hub portion 70 of a somewhat cone-shaped housing 72 which has surfaces fitting the shank and against the outer end of the piston and also an inwardly extending portion, preferably with fitted bearing surfaces as at 73 for engaging the axially movable rotating cylinder 40. The housing member 72 is shown as fitted to the side disk member 6 and securely held thereto by bolts 74. It will be noted that the hub portion has a shoulder engaging the outer shoulder face of the piston, thus affording a reaction member against which the piston pressure is taken when the cylinder is urged inwardly under the liquid pressure. The piston 50 is preferably keyed to the housing 72 as by a dowel pin 76.

It is apparent that any oil escaping from the open end of the cylinder is prevented from working toward the clutch by reason of the close fit of the carrying bearing surface 73 on the outside of the cylinder 40. As a means for recovering any overflow of oil and to further assure that the oil will be carried away from, rather than toward the clutch, I may provide within the housing 72 an oil receiving channel 75, from which lead passages 77 venting into a stationary oil collecting channel 80, shown as rigidly secured at 81 to an outwardly projecting flange on the sleeve 58. From this housing may lead a suitable drain pipe 83.

A flange and groove as at 85 on the outer end of the rotating cylinder within the channel 75 further tends to prevent oil working inwardly toward the clutch.

A similar oil collecting flange and groove 86 is shown as formed on the housing member 72 and within the collecting channel 80, which in turn is provided with a flange 88 extending inwardly toward the cylinder carrying hub 70, and forming in effect an annular channel within the stationary housing 80. Thus any oil reaching this housing is retained therein and is prevented from working toward the clutch operating parts.

It is apparent that oil under pressure may be applied through the pipe 54 and lead through the passage 52 to the inner end of the piston. Several hundred pounds pressure, for example in the large forging machine, 800 to 1,000 pounds per square inch,—of oil may be used with the result that the piston may be small and the effective pressure of the oil will assure applying the desired pressure to the friction disk operating member 30. Obviously, under such pressures, any fluid would be likely to leak somewhat between relatively moving surfaces, but with the arrangement shown, I have effectively prevented the oil from reaching the clutch, and the clutch disks will remain perfectly dry over long periods of operation.

It will be further noted that the diameter of the piston and cylinder is relatively small when compared to the diameter of operating piston rings heretofore used, for example, such as shown in the prior patent referred to.

It is also well known that when an oil connection is made by axially threading a pipe into a rotating part, as is usually necessary in such constructions, desirable accuracy consistent with the necessary close fits is difficult to attain, packing problems are afforded, and these are eliminated by the arrangement shown.

It is to be understood that various modifications may be made of this invention without departing from the scope and spirit of the invention particularly as comprised in the appended claims.

Having thus described my invention, what I claim is:

1. In an apparatus of the character described, a driving member, a driven shaft carrying the driving member, friction disks alternately connected to the driving member and said shaft, means urging the disks together comprising an axially movable member coaxial with the disks and rotatable about its axis a co-axial outwardly facing cylinder in abutting relation thereto, said cylinder having a co-axial outward circumferential sealing surface of substantial width axially of the cylinder, a carrying member secured to the driving member and embracing the circumferential sealing surface of the cylinder and providing therewith a sealed slip joint in all positions of the cylinder and housing and having a piston carrying portion with a shoulder, a piston in the cylinder and abutting against the shoulder to prevent axial movement of the piston while permitting relative axial movement of the cylinder, said piston having a passage leading to its inner end for admitting pressure fluid between the cylinder and piston.

2. In a clutch of the character described, a driving member, a co-axial driven shaft, frictional disks alternately splined to said driving member and said shaft, an outwardly facing cylinder having an external circumferential extending slide surface, a carrying member having an inner surface embracing said circumferentially extending surface of the cylinder and forming an oil seal therewith and having a piston engaging portion, said cylinder and carrying member being relatively movable axially, a piston in said cylinder and having a shoulder abutting against said portion to prevent axial movement of the piston, said piston having a passage leading to its inner end for conducting liquid under pressure to move said cylinder.

3. In an apparatus of the character described, a driving member, a driven member, cooperating friction elements connected to the members, respectively, means for forcing the elements together and comprising an axially movable cylinder operatively connected to said elements and having an open end facing away from the elements, and having an outer wide circumferential sealing slide surface intermediate its ends, an axially stationary piston in and reciprocable relative to said cylinder, a carrying member secured to one of said first mentioned members and having a wide surface snugly embracing the circumferential sealing slide surface of the cylinder and providing a slip fit joint therebetween, and said piston having a passage leading to the inner end thereof for admitting pressure fluid between the cylinder and the piston.

4. In an apparatus of the character described, a driving member, a driven member, cooperating friction elements connected to the members, respectively, means for forcing the elements together and comprising an axially movable cylinder operatively connected to said elements and having an open end facing away from the elements, and having an outer wide circumferential sealing slide surface portion intermediate its ends, an axially stationary piston in and reciprocable relative to said cylinder, a carrying member secured to one of said first mentioned members and having a wide circumferential surface portion snugly embracing the circumferential sealing slide surface portion of the cylinder and providing a slip fit joint therebetween, said piston having a passage leading to the inner end thereof for admitting pressure fluid between the cylinder and the piston, and an outwardly extending flange on the cylinder between the open end and said sealing surface for centrifugally discharging slip fluid escaping from the cylinder.

5. A hydraulically operated clutch mechanism including a driven shaft, bearing means supporting the shaft for rotation, said shaft having a free end portion extending beyond the bearing means, spaced bearing portions on said shaft arranged one bearing portion adjacent the said bearing means and the other bearing portion adjacent the free end of the shaft, a fly wheel mounted on said spaced bearing portions for rotation relative to the shaft and having a cavity between the bearing portions, a friction clutch element within the cavity and rotatable with the fly wheel, a cooperating friction clutch element within the cavity and rotatable with the shaft, said clutch elements being relatively movable with respect to each other for mutual engagement and disengagement, a hydraulic piston, means mounting said piston in fixed and closely spaced relation to the free end of the shaft and in axial alignment with the shaft, a cylinder fitting said piston and opening away from the shaft and having a closed end portion lying between the piston and shaft, means for supplying fluid pressure through the end of the piston adjacent the cylinder, said fly wheel having an end wall adjacent the free end of the shaft and having openings affording access to said cavity, and arms carried by the cylinder extending through said openings and being operatively connected to the friction clutch elements within the cavity for operating the same in one direction, and return means for returning the friction clutch elements in the opposite direction.

6. A hydraulically operated clutch mechanism including a driven shaft, bearing means supporting the shaft for rotation, said shaft having a free end portion extending beyond the bearing means, spaced bearing portions on said shaft arranged one portion adjacent the said bearing means and another bearing portion adjacent the free end of the shaft, a fly wheel mounted on said spaced bearing portions for rotation relative to the shaft and having a cavity between the bearing portions, clutch elements connected to the fly wheel for rotation therewith and positioned within the cavity, cooperating clutch elements connected to the shaft for rotation therewith, said clutch elements being relatively movable with respect to each other for mutual engagement and disengagement, a hydraulic piston, means mounting said piston in fixed and closely spaced relation to the free end of the shaft and in axial alignment with the shaft, a cylinder fitting said piston and opening away from the shaft and having a closed end portion lying between the piston and shaft, said cylinder having an external annular bearing surface, a housing mounted on and rotatable with the fly wheel and having an internal bearing surface in axially sliding engagement with the bearing surface of the cylinder, said surfaces being of sufficient length axially to afford a fluid seal between the cylinder and bearing surface of the housing, means for supplying fluid pressure through the end of the piston adjacent the shaft into the cylinder, said fly wheel having a wall adjacent the free end of the shaft and openings in said wall affording access to said cavity, and arms carried by the cylinder extending through said openings and being operatively connected to the clutch elements within the cavity for operating the same in one direction, and return means for returning the clutch elements in the opposite direction.

7. A hydraulic operated clutch including a heavy fly wheel, a shaft, axially spaced bearings rotatably supporting the fly wheel on the shaft and arranged between the end limits of the fly wheel rim and the outer limits of the bearings being substantially flush with the ends of the fly wheel rim, and said shaft terminating at one end substantially at the outer limit of one of the bearings, driving and driven friction clutch elements connected to the fly wheel and shaft, respectively, for engagement with each other for drivingly connecting the fly wheel and shaft, resilient means normally maintaining said driving and driven friction clutch elements in one position, hydraulic operated means for causing pressure engagement of the driving and driven friction clutch elements, said hydraulic operated means comprising an axially movable cylinder open at one end and being in axial alignment with the driven shaft and in closely spaced relation to the said one end of the shaft, and having its open end directed away from the friction clutch elements, a piston fitted in said cylinder and in fixed position axially with respect to the shaft, said piston having a passage opening into the inner face of the piston for conducting liquid under pressure into the cylinder to cause axial movement of the cylinder toward the friction clutch elements, the fly wheel having radial end walls positioned axially substantially at the end limits of the rim, the end wall adjacent the cylinder having an opening affording access to the friction clutch elements, and an arm movable by the cylinder and having a portion extending through the opening and operatively connected with the friction clutch elements for moving the same into another position by the cylinder.

8. In a clutch of the character described, a driven shaft, a driving member carried thereby, axially movable friction elements alternately fixed upon and rotatable with said driving member and said shaft respectively, said friction elements being disposed inwardly from one end of the shaft, and hydraulic pressure activated means for forcing said elements into engagement, said means comprising a piston axially stationary with respect to the driving member, and an axially movable solid headed cylinder surrounding the piston and opening away from the said end of the shaft, said piston and cylinder being disposed beyond said end of the shaft and in axial alignment with said shaft, rigid supports from one of said friction elements to the cylinder, other rigid supports from an axially immovable part of the driving member to said piston, and said supports being out of contact with said shaft.

9. A clutch comprising in combination, a shaft, a housing thereon having axially spaced body portions, axially spaced bearings on said shaft for the respective body portions, interengageable friction clutch plates respectively carried by the said housing and by the shaft and positioned between said body portions, and hydraulic activated means including a piston directed inwardly toward one end of the shaft and fixedly secured to said housing and in aligned spaced relation to said end of the shaft, a solid headed cylinder mounted on said piston and operatively associated with said clutch plates for applying pressure on said clutch plates upon axial movement of the cylinder in one direction.

10. A clutch comprising in combination, a shaft, a flywheel upon one end of the shaft and having body portions spaced axially of the shaft with respect to each other, bearings axially spaced on said shaft and carrying said body portions respectively, clutch plates carried by said flywheel and by the shaft respectively and disposed between said body portions, and operating mechanism for said clutch plates, said mechanism including a piston fixedly secured to said flywheel in aligned spaced relation to the said one end of said shaft and directed inwardly toward said end of the shaft, a solid headed cylinder mounted on said piston and operatively connected to the outermost of said clutch plates for applying pressure to said outermost clutch plate, and connections for supplying hydraulic pressure to the space between the piston end and the cylinder head.

11. A clutch comprising in combination, a shaft, a flywheel upon one end of said shaft, said flywheel having body portions spaced axially of the shaft with respect to each other, axially spaced bearings on said shaft carrying said body portions respectively, clutch plates carried by said flywheel and by said shaft respectively and disposed between said body portions, and operating mechanism for operating said clutch plates, said mechanism including a piston secured to said flywheel in fixed position with respect thereto and facing inwardly toward said one end of the shaft and in aligned spaced relation to said one end of the shaft, and a solid headed cylinder mounted on said piston with its head portion disposed toward said end of the shaft, means connecting the cylinder to the outermost of said clutch plates for applying pressure to the clutch plates upon movement of said cylinder, said piston being provided with a passage for supplying hydraulic pressure into the space between said piston end and said cylinder head.

WILLIAM W. CRILEY.